United States Patent [19]
Trader et al.

[11] Patent Number: 5,854,837
[45] Date of Patent: Dec. 29, 1998

[54] METHOD AND SYSTEM FOR PROVIDING INTERACTIVE DATA EXCHANGE BETWEEN AN INTERACTIVE PLATFORM AND A CALLER

[75] Inventors: Terry F. Trader, Castle Rock; Leslie Darrell Cox, Arvada, both of Colo.

[73] Assignees: U S WEST, Inc., Denver; MediaOne Group, Inc., Englewood, both of Colo.

[21] Appl. No.: 587,115

[22] Filed: Jan. 9, 1996

[51] Int. Cl.$^6$ .................................................. H04M 3/58
[52] U.S. Cl. .......................... 379/265; 379/212; 379/214
[58] Field of Search .................................. 379/201, 210, 379/211, 212, 213, 214, 265, 207, 67, 88

[56] References Cited

U.S. PATENT DOCUMENTS

| | | | |
|---|---|---|---|
| 4,763,353 | 8/1988 | Canale et al. | 379/265 |
| 5,073,890 | 12/1991 | Danielsen | 379/265 |
| 5,164,981 | 11/1992 | Mitchell et al. | 379/88 |
| 5,291,551 | 3/1994 | Conn et al. | 379/265 |
| 5,299,260 | 3/1994 | Shaio | 379/210 |
| 5,396,542 | 3/1995 | Alger et al. | 379/210 |
| 5,459,780 | 10/1995 | Sand | 379/265 |
| 5,590,187 | 12/1996 | Greenspan | 379/212 |

*Primary Examiner*—Ahmad F. Matar
*Attorney, Agent, or Firm*—Brooks & Kushman

[57] ABSTRACT

A method and system for providing interactive data exchange between an interactive platform, a caller and at least one operator work associated with the interactive platform. A public switched telephone network having a call transfer feature connects the caller to the interactive platform and connects the caller to the at least one operator in response to an operator assistance signal. The interactive platform is operatively connected to the public switched telephone network and includes an audiotex subsystem for responding to a plurality of telephone signals received from the caller and facilitating interactive data exchange with the caller by providing audio output signals to the caller in response to the plurality of telephone signals. The interactive platform further stores an interactive data exchange record representing the interactive data exchange between the caller and the interactive platform. The at least one operator is operatively connected to the public switched telephone network for transmitting and receiving telephone signals to and from the caller and for receiving at least a portion of the interactive data exchange record stored by the interactive platform in response to the operator assistance signal.

19 Claims, 4 Drawing Sheets

Call Flow Information

Call ID: 0

| Date Time | Call Flow Id | Description | Response | Result Id | Event Id | System Id | Host Id | Port Id |
|---|---|---|---|---|---|---|---|---|
| 1/3/95 17:41:24 | 0 | Off Hook | | 0 | 5525795 | DRMN | DRMN | 4 |
| 1/3/95 17:41:27 | 101 | Menu Selection | # | 2005 | 5525796 | DRMN | DRMN | 4 |
| 1/3/95 17:41:28 | 102 | Menu Selection | 0 | 2005 | 5525797 | DRMN | DRMN | 4 |
| 1/3/95 17:41:32 | 155 | Menu Selection | | 2004 | 5525798 | DRMN | DRMN | 4 |
| 1/3/95 17:41:32 | 155 | Out Dial | &L97842833 | 0 | 5525799 | DRMN | DRMN | 4 |
| 1/3/95 17:42:31 | 155 | Menu Selection | 0 | 2005 | 5525811 | DRMN | DRMN | 4 |
| 1/3/95 17:42:44 | 102 | Menu Selection | | 2006 | 5525812 | DRMN | DRMN | 4 |
| 1/3/95 17:42:44 | 102 | User Entry | 1 | 0 | 5525813 | DRMN | DRMN | 4 |
| 1/3/95 17:42:44 | 102 | Menu Selection | 1 | 2005 | 5525814 | DRMN | DRMN | 4 |
| 1/3/95 17:42:48 | 245 | Menu Selection | # | 2006 | 5525815 | DRMN | DRMN | 4 |

Log As Problem       Close

Fig. 2

METHOD AND SYSTEM FOR PROVIDING INTERACTIVE DATA EXCHANGE BETWEEN AN INTERACTIVE PLATFORM AND A CALLER

TECHNICAL FIELD

This invention relates to methods and systems for providing interactive data exchange between an interactive platform including at least one operator and a caller utilizing a public switched telephone network.

BACKGROUND ART

A data retrieval system incorporating a computer voice response unit provides limited computer. prompted queries and limited voice responses to a caller. In this system, the caller responds to the prompt queries by entering a selected number sequence on the touchtone keypad of the caller's telephone. However, as the computer voice response unit cannot be programmed to anticipate all questions, the menu of prompting questions provided to the caller and the overall efficiency of the unit is somewhat limited. For example, if the outside party requests to be transferred to an operator for additional help or information, the operator is at most, only apprised of the calling party's name, account number and perhaps his or her telephone number. The operator is without knowledge as to the reason for the caller's transfer as well as the status of the information exchanged thus far between the outside party and the voice response unit.

Another known prior art system as disclosed in U.S. Pat. No. 5,164,981, issued to Mitchell et al., provides telephone access to a customer database information by initially connecting an outside party on a telephone apparatus to a database through a computerized voice response unit providing digitized voice prompts, questions and other information prompts to the outside caller. The outside caller responds to the prompts by entering a selected sequence of numbers on the telephone touchtone keypad. In addition to providing a transfer of voice signals from the computerized voice response unit to an operator, the system provides the operator with a list of information transacted thus far, as well as other information, such as calling party identity and account status. This system, however, requires a voice path switch, such as an Automatic Call Distributor (ACD) or a Private Branch Exchange (PBX), in addition to the voice response unit which adds to the overall cost of the system. The operator is tied directly to this switch and not to a public switched telephone network.

There exists a need for an inexpensive system for providing telephone access to a customer database and to an operator while providing the operator with a list of information transacted between the caller and the customer database.

DISCLOSURE OF THE INVENTION

It is thus a general object of the present invention to provide an inexpensive method and system for providing interactive data exchange between an interactive platform and a caller utilizing a public switched telephone network.

It is a further object of the present invention to provide a method and system for automatically providing a caller with operator assistance during interactive data exchange between the caller and the interactive platform.

It is yet another object of the present invention to provide a method and system for providing the operator with a list of information transacted between the caller and the interactive platform.

In carrying out the above objects and other objects, features and advantages of the present invention, a method is provided for facilitating interactive data exchange between an interactive platform, a caller and at least one operator associated with the interactive platform. The method includes the step of utilizing a public switched telephone network having a call transfer feature to access the interactive platform on an incoming telephone line. The method also includes the step of providing interactive data exchange between the interactive platform and the caller. The method further includes the step of storing an interactive data exchange record representing the interactive data exchange between the caller and the interactive platform. In response to the caller requesting operator assistance, a first switchhook flash is provided on the incoming telephone line utilizing the call transfer feature so as to place the caller on hold and obtain a dial tone. Still further, the method includes the step of utilizing the dial tone to connect the caller with the at least one operator while maintaining the connection between the caller and the interactive platform. The method concludes with the step of providing the operator with at least a portion of the interactive data exchange record so as to assist the operator in instructing the caller.

In further carrying out the above objects and other objects, features and advantages, of the present invention, a system is also provided for carrying out the steps of the above described method. The system includes a public switched telephone network having a call transfer feature for connecting the caller to the interactive platform and for utilizing the call transfer feature to connect the caller to the at least one operator in response to an operator assistance signal. The interactive platform includes an audiotex subsystem operatively connected to the public switched telephone network for responding to a plurality of telephone signals received from the caller and for facilitating interactive data exchange between the caller and the interactive platform by providing audio output signals to the caller in response to the plurality of telephone signals. The audiotex subsystem further stores an interactive data exchange record representing the interactive data exchange between the caller and the interactive platform. The system further includes at least one operator operatively connected to the public switched telephone network transmitting and receiving telephone signals to and from the caller and for receiving at least a portion of the interactive data exchange record stored by the audiotex subsystem in response to the operator assistance signal.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 2 is a schematic diagram illustrating the list of information transferred to the operator.

BEST MODES FOR CARRYING OUT THE INVENTION

Figure 1:
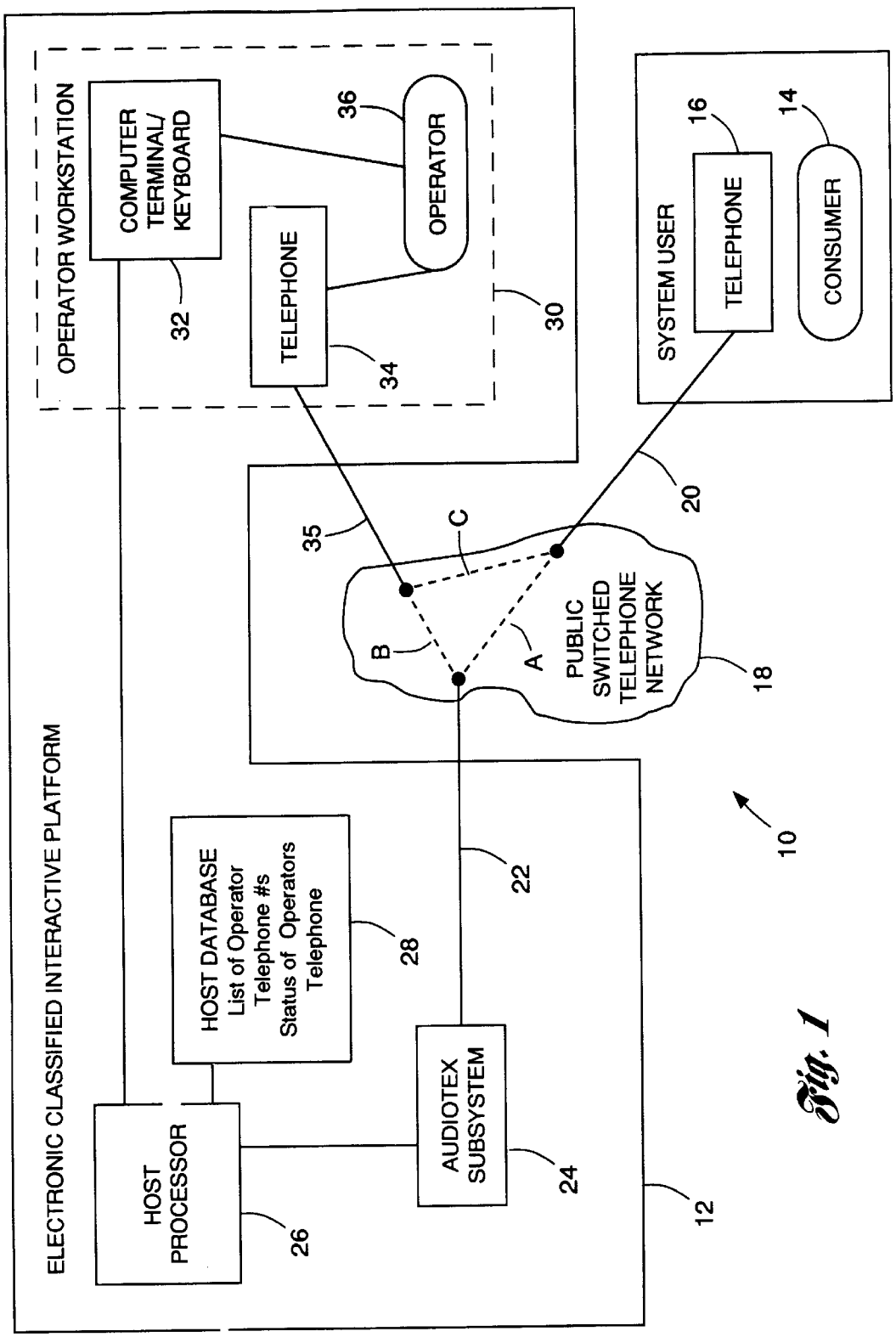
FIG. 1 is a block diagram of the preferred embodiment of the system of the present invention.

Turning now to FIG. 1, there is shown a block diagram of the system of the present invention, denoted generally by reference numeral 10. The system 10 includes an interactive platform 12, such as an electronic classified interactive platform. The interactive platform 12 is essentially an automated operator, taking the place of a human operator for initially establishing interactive data exchange between an outside caller 14, such as a consumer. The outside caller 14 utilizes an outside telephone apparatus 16, such as a touchtone telephone, to exchange with the interactive platform 12.

The telephone apparatus 16 is connected to a Public Switched Telephone Network (PSTN) 18 via a standard business or residence telephone line 20. The PSTN 18 is a local telephone provider, such as a Regional Bell Operating Company (RBOC), e.g., U.S. West or Nynex, or a Local Exchange Company (LEC). The interactive platform 12 is also connected to the PSTN 18 utilizing, preferably, two-way Direct Inward Dialing (DID) type telephone lines 22 equipped with a call transfer feature. The call transfer feature allows a call from one station or extension to be transferred to another.

The interactive platform 12 includes an audiotex subsystem 24 for providing audio output signals in response to telephone signals received from the outside caller 14. The audiotex subsystem 24 is a personal computer with an extended back plane which houses audio processing circuit boards. The audiotex subsystem 24 has a hard drive which contains: all of the audio files needed to play most auto or home classified ads and system prompts, operating system software, application software, configuration tables, log files and other miscellaneous tables necessary to support the application and configuration. The audiotex subsystem 24 is capable of recognizing the touch tone inputs, deciding which prompts to play next and converting analog to digital and digital to analog conversion of sound and human voice. Upon establishing a link between the interactive platform 12 and the outside caller 14, the interactive platform 12 plays a prerecorded message, prompting the outside caller 14 to input selected information on the touchtone keypad or other similar mechanism associated with the telephone apparatus 16.

The interactive platform 12 also includes a host processor 26 for processing classified ads into a relational database, including text, pictures and graphic images (either still frame or multiple frame), scripting audio ads by finding the correct audio files to say all of the information in the original text versions of the classified ads, and for looking up the ads in its relational database based on search criteria specified by the caller 14 and as requested by the audiotex subsystem 24. The host processor 26 also has the functions of controlling the operator workstation terminals as described below and keeping rack of the status of each operator. The audiotex subsystem 24 requests the host processor 26 to perform a database hookup at various stages in the call after search criteria has been entered by the caller 14. The ads returned to the audiotex subsystem 24 by the host processor 26 is in the form of the file addresses of each audiofile in sequential order that must be played to comprise the scripted ad.

The interactive platform 12 further includes a host database 28 coupled to the host processor 26 for storing a list of operator telephone numbers. The host database 28 also monitors the status of operator telephones, as will be described below.

Still further, the interactive platform 12 includes at least one operator work station 30. The operator work station 30 includes a computer terminal/keyboard 32 coupled to the host processor 26. Each operator work station 30 is equipped with a telephone apparatus 34, such as a touchtone telephone, which uses a standard private party business line 35 in which the telephone number is not published. The business line 35 is purchased and provided by the local RBOC via the PSTN 18. An operator 36 interacts with the computer terminal/keyboard 32 and the telephone apparatus 34.

The computer terminal/keyboard 32 includes an application which allows the operator 36 to log in to the host processor 26 so that the host processor 26 knows that the operator work station 30 is occupied and available to take calls. The operator 36 also has the ability to be logged in but to make the position busy to incoming calls. It is by these two functions, logging on and making the position available for calls, that the host processor 26 knows that the operator work station 30 can be sent calls.

Figure 3A:
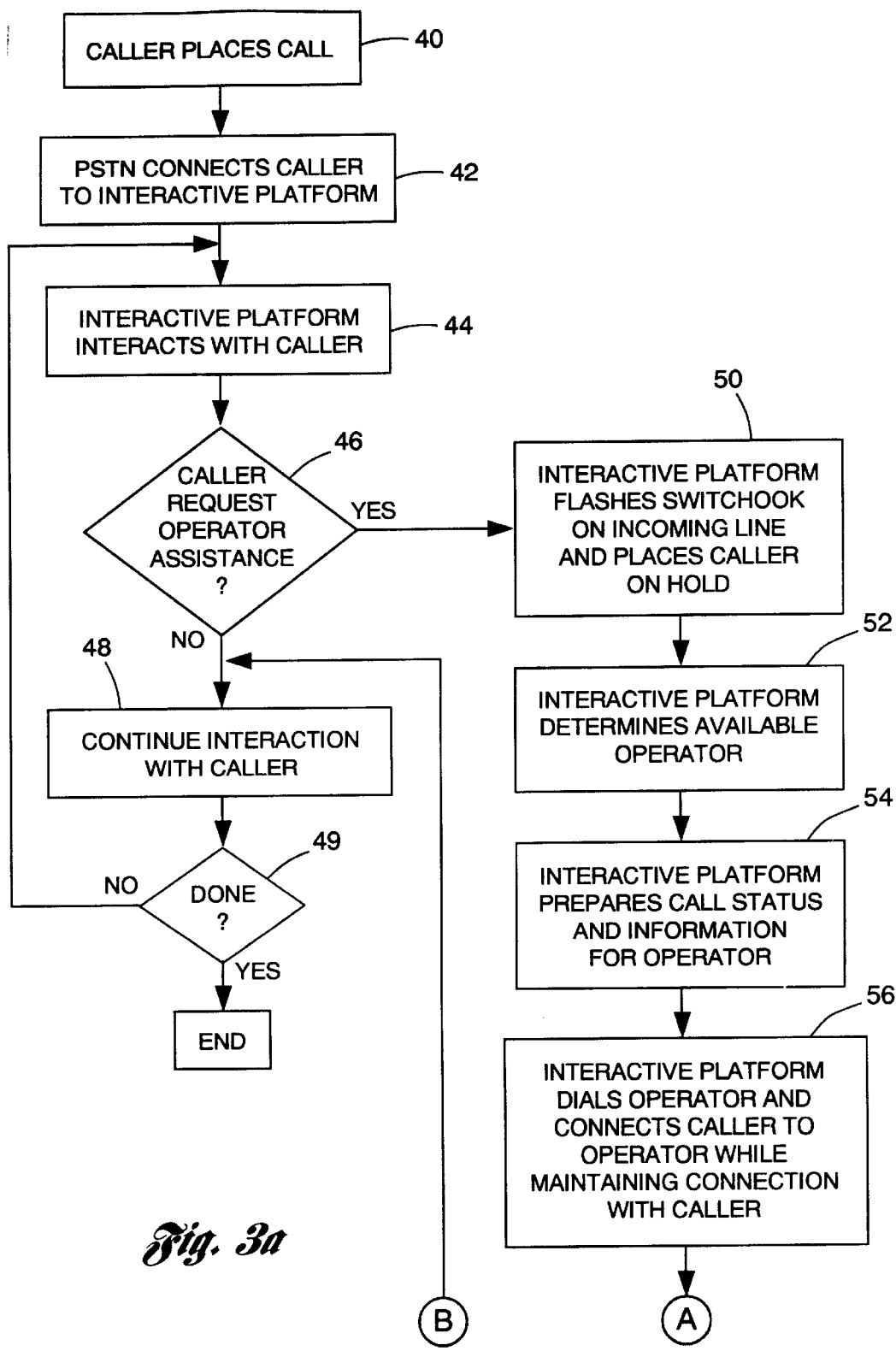
FIGS. 3a–3b is a flowchart illustrating the general sequence of steps associated with the operation of the present invention.
Figure 3B:
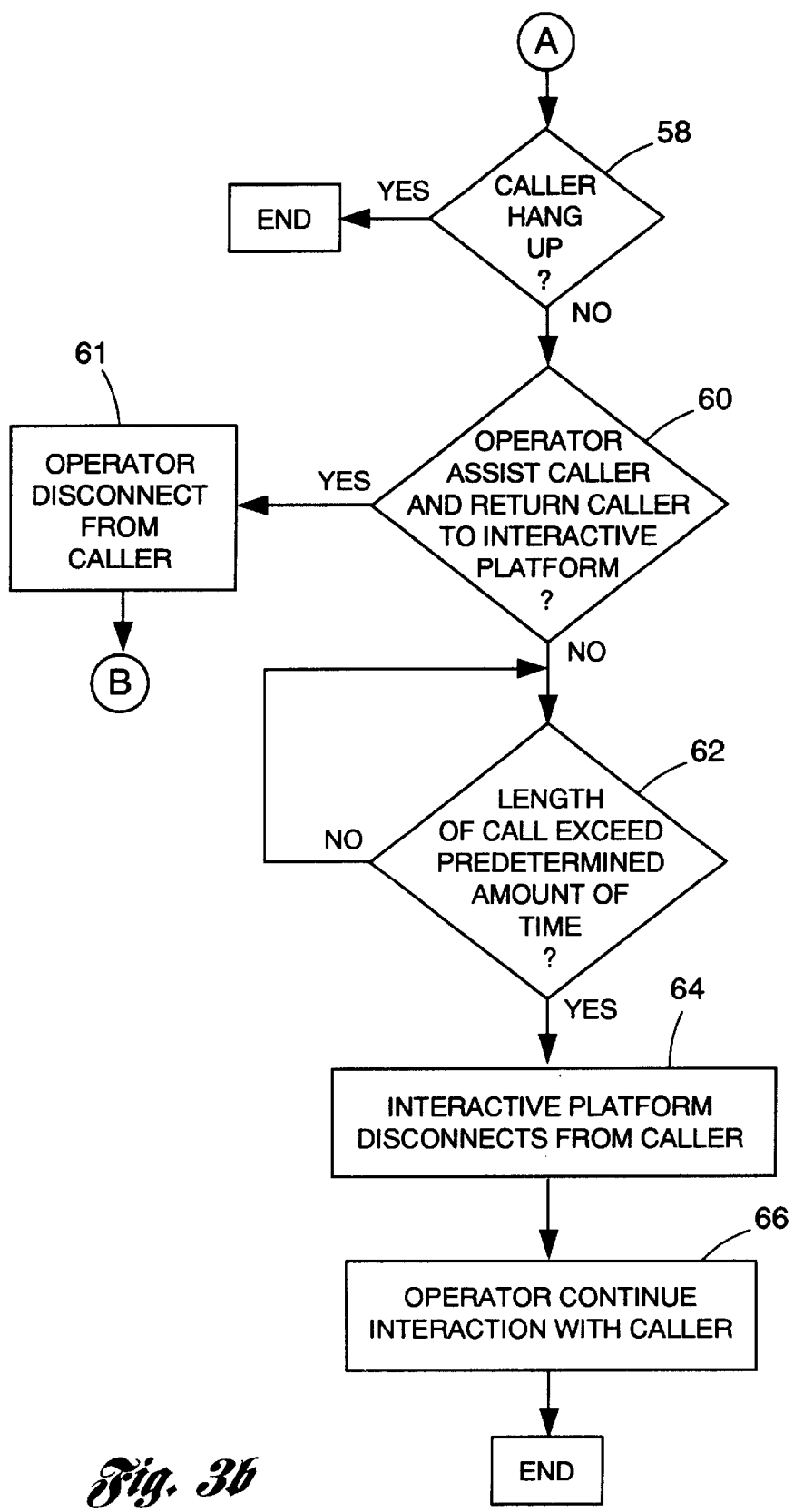

Referring now to FIGS. 3*a*–3*b*, the operation of the present invention will now be described. First, the outside caller 14 places a call to the interactive platform 12, as indicated at block 40. The outside caller 14 dials the local access number of the interactive platform 12. The PSTN 18 selects an idle line associated with the interactive platform 12 and rings in to this line thereby connecting the outside caller 14 to the interactive platform 12 via the path marked by the letter "A" in FIG. 1, as shown at block 42.

The interactive platform 12 answers this telephone call and begins interacting with the caller 14, as indicated at block 44. The interactive platform 12 interacts with the caller 14 by playing prompts and asking the caller 14 to answer questions by keying digits on the touchtone keypad on the telephone apparatus 16.

If the caller has not requested operator assistance, block 46, the interaction between the interactive platform 12 and the caller 14 continues, as indicated at block 48. The method continues to determine if the caller is done, as shown at conditional block 49. If not, the interactive platform 12 continues to interact with the caller 14.

If the caller desires to have operator assistance, for example, by pressing the "0" key to enact such action, the interactive platform 12 initiates the following actions. The interactive platform 12 "flashes" the switchhook on the incoming line in which the caller 14 arrived and is still connected to in order to obtain a second dial tone, as indicated at block 50. This is accomplished utilizing the call transfer feature. This action causes the caller 14 to be placed in a hold condition and the interactive platform 12 to receive a stutter dial tone (both of these actions being provided by the RBOC switch of the PSTN 18 to which the access lines are connected for service).

The interactive platform 12 performs a look-up on the host database 28 to determine from a status table which operators are logged in and available to take calls, as shown at block 52. If more than one operator 36 meets this criteria, the host database 28 makes a decision regarding which operator 36 should be assigned to the call based on an algorithm to spread the calls evenly across the available operator staff. When the appropriate operator 36 has been selected, the telephone number is returned to the interactive platform 12.

At this time, the interactive platform 12 also prepares information about the call utilizing the host processor 26 so that a screen can be created for the appropriate operator 36 showing him or her where the caller 14 had been in the call flow from the beginning of the call up to the point where the operator assistance was requested, as shown at block 54. This information assists the operator 36 in instructing the caller 14. An example of a screen containing the list of information transferred to the operator is shown in FIG. 2.

The interactive platform 12 now dials the telephone number of the appropriate operator 36, block 56, so that the path marked "B", FIG. 1, in the PSTN 18 is connected. When the operator 36 answers, the interactive platform 12 flashes the switchhook one more time. This action causes the central office (not shown) in the PSTN 18 to take the caller 14 off hold and connect all three parties together, i.e., the caller 14, the interactive platform 12 and the operator 36. A connection is then made along the paths marked "A" and "B", as shown in FIG. 1.

As a result of the conversation between the caller 14 and the operator 36, several final actions may occur. First, the operator 36 and the caller 14 can both hang up, as shown at conditional block 58. At this time, all telephone lines are disconnected and the system 10 is in an idle state.

Secondly, the operator 36 may key in touchtone digit(s) that is(are) recognized by the interactive platform 12 as an answer to the last and therefore current question that was asked by the caller 14, as shown at conditional block 60. At this time, the operator 36 is disconnected from the caller 14, as shown at block 61, and the caller 14 once again begins interacting with the interactive platform 12. The connection along path "B" (FIG. 1) is disconnected while the connection along path "A" (FIG. 1) remains active.

Another action results when the length of the call between the operator 36 and the caller 14 exceeds a predetermined amount of time, as shown at conditional block 62. At this time, the interactive platform 12 produces a second switchhook flash which causes the central office (not shown) in the PSTN 18 to disconnect the connection to the interactive platform 12 (path "A", FIG. 1), as shown at block 64. The connection established between the caller 14 and the operator 36 (path "C") remains, as shown at block 66, until either of them breaks this connection by hanging up. This third action described herein is the final step of a call transfer function provided by the call transfer feature of the access telephone line. This action is taken to free up the incoming line on the interactive platform 12 for other calls should the operator 36 and the caller 14 have an extremely long conversation.

While the best modes for carrying out the invention have been described in detail, those familiar with the art to which this invention relates will recognize various alternative designs and embodiments for practicing the invention as defined by the following claims.

What is claimed is:

1. A method for providing interactive data exchange between a caller and an interactive platform having at least one operator associated therewith, the method comprising:

providing a public switched telephone network having a call transfer feature, the public switched telephone network for connecting the caller to the interactive platform and for utilizing the call transfer feature for connecting the caller to the at least one operator in response to an operator assistance signal while maintaining the connection between the caller and the interactive platform;

providing the interactive platform operatively connected to the public switched telephone network for responding to a plurality of telephone signals received from the caller and for facilitating interactive data exchange with the caller by providing audio output signals to the caller in response to the plurality of telephone signals, the interactive platform further for storing an interactive data exchange record representing the interactive data exchange between the caller and the interactive platform and for generating the operator assistance signal in response to the caller requesting assistance from the operator; and providing the at least one operator operatively connected to the public switched telephone network for transmitting and receiving telephone signals to and from the caller and for receiving at least a portion of the interactive data exchange record stored by the interactive platform in response to the operator assistance signal.

2. The method as recited in claim 1 wherein providing the public switched telephone network further includes providing the public switched telephone network for returning the caller to the interactive platform after the caller obtains assistance from the at least one operator.

3. The method as recited in claim 2 wherein providing the public switched telephone network for returning the caller to the interactive platform further includes providing the public switched telephone network for disconnecting the at least one operator from the caller.

4. The method as recited in claim 1 wherein the interactive platform includes a plurality of operators and wherein providing the interactive platform for generating the operator assistance signal includes providing the interactive platform for determining an available operator from the plurality of operators.

5. The method as recited in claim 4 wherein the interactive platform includes a host database containing telephone numbers of the plurality of operators who have logged in and wherein providing active platform for determining the available operator includes providing the interactive platform for determining which of the plurality of operators have logged in.

6. The method as recited in claim 4 wherein providing the interactive platform for determining the available operator includes providing the interactive platform determining the available operator based on a predetermined algorithm.

7. The method as recited in claim 1 wherein providing the interactive platform further includes providing the interactive platform for determining a length of time the caller interacts with the at least one operator, comparing the length of time with a predetermined time limit, and disconnecting the caller from the interactive platform if the length of time exceeds the predetermined time limit.

8. For use with an interactive platform coupled to a public switched telephone network that provides access to the interactive platform via an incoming telephone line, and has a call transfer feature, a method for providing interactive data exchange between a caller accessing the interactive platform and at least one operator associated with the interactive platform and coupled to the public switched telephone network, the method comprising:

providing interactive data exchange between the interactive platform and the caller;

storing an interactive data exchange record representing the interactive data exchange between the caller and the interactive platform;

in response to the caller requesting assistance from the operator, providing a first switchhook flash on the incoming telephone line utilizing the call transfer feature of the public switched telephone network so as to place the caller on hold and obtain a dial tone;

utilizing the dial tone to connect the caller with the at least one operator while maintaining the connection between the caller and the interactive platform;

providing the at least one operator with at least a portion of the interactive data exchange record so as to assist the at least one operator in instructing the caller;

determining a length of time the caller interacts with the at least one operator;

comparing the length of time with a predetermined time limit; and disconnecting the caller from the interactive platform if the length of time exceeds the predetermined time limit.

9. The method as recited in claim 8 wherein the step of disconnecting the caller includes the step of providing a second switchhook flash on the incoming telephone line.

10. For use with an interactive platform coupled to a public switched telephone network having a call transfer feature, a system for providing interactive data exchange between a caller and at least one operator associated with the interactive platform and coupled to the public switched telephone network, the system comprising:

the public switched telephone network for providing access to the interactive platform on an incoming telephone line; and the interactive platform including:

means for providing interactive data exchange with the caller;

means for storing an interactive data exchange record representing the interactive data exchange between the caller and the interactive platform;

means for providing a first switchhook flash on the incoming telephone line in response to the caller requesting operator assistance so as to place the caller on hold and obtain a dial tone and for connecting the caller with the at least one operator while maintaining the connection between the caller and the interactive platform;

means for providing the at least one operator with at least a portion of the interactive data exchange record so as to assist the operator in instructing the caller;

means for determining a length of time the caller interacts with the at least one operator;

means for comparing the length of time with a predetermined time limit; and means for disconnecting the caller from the interactive platform if the length of time exceeds the predetermined time limit.

11. The system as recited in claim 10 wherein the means for disconnecting the caller from the interactive platform includes means for utilizing a second switchhook flash on the incoming telephone line.

12. A system for providing interactive data exchange between an interactive platform, a caller and at least one operator associated with the interactive platform, the system comprising:

a public switched telephone network having a call transfer feature, the public switched telephone network for connecting the caller to the interactive platform and for utilizing the call transfer feature for connecting the caller to the at least one operator in response to an operator assistance signal while maintaining the connection between the caller and the interactive platform;

the interactive platform operatively connected to the public switched telephone network for responding to a plurality of telephone signals received from the caller and for facilitating interactive data exchange with the caller by providing audio output signals to the caller in response to the plurality of telephone signals, the interactive platform further for storing an interactive data exchange record representing the interactive data exchange between the caller and the interactive platform and for generating the operator assistance signal in response to the caller requesting assistance from the operator; and the at least one operator operatively connected to the public switched telephone network for transmitting and receiving telephone signals to and from the caller and for receiving at least a portion of the interactive data exchange record stored by the interactive platform in response to the operator assistance signal.

13. The system as recited in claim 12 wherein the public switched telephone network is further operative to return the caller to the interactive platform after the caller obtains assistance from the at least one operator.

14. The system as recited in claim 13 wherein the public switched telephone network is farther operative to disconnect the at least one operator from the caller in return the caller to the interactive platform.

15. The system as recited in claim 12 wherein the interactive platform includes a plurality of operators and wherein the interactive platform is further operative to determine an available operator from the plurality of operators in response to the caller requesting operator assistance.

16. The system as recited in claim 15 wherein the interactive platform includes a host database containing telephone numbers of the plurality of operators who have logged in and wherein the interactive platform, in determining the available operator, is further operative to determine the available operator based on which of the plurality of operators have logged in.

17. The system as recited in claim 15 wherein the interactive platform, in determining the available operator, is further operative to determine the available operator based on a predetermined algorithm.

18. The system as recited in claim 12 wherein the interactive platform is an electronic classified interactive platform.

19. The system as recited in claim 12 wherein the interactive platform is further operative to determine a length of time the caller interacts with the at least one operator, compare the length of time with a predetermined time limit, and disconnect the caller from the interactive platform if the length of time exceeds the predetermined time limit.

* * * * *

UNITED STATES PATENT AND TRADEMARK OFFICE
CERTIFICATE OF CORRECTION

PATENT NO. : 5,854,837
DATED : December 29, 1998
INVENTOR(S) : Terry F. Trader, Leslie Darrell Cox It is certified that error appears in the above-identified patent and that said Letters Patent is hereby corrected as shown below:

In Claim 5, column 6, line 28: after "providing" delete "active" and insert --the interactive--.

In Claim 6, column 6, line 34: after "platform" insert --for--.

In Claim 14, column 8, line 27: after "is" delete "farther" and insert --further--.

In Claim 14, column 8, line 29: after "in" delete "return" and insert --returning--.

Signed and Sealed this

Twenty-fifth Day of May, 1999

Attest:

Q. TODD DICKINSON

*Attesting Officer*  *Acting Commissioner of Patents and Trademarks*